Sept. 29, 1964　　　　M. P. HARTNETT　　　　3,150,720
ATTACHMENT FOR ROTARY POWER MOWERS
Filed Jan. 30, 1961　　　　　　　　　　　　2 Sheets-Sheet 2
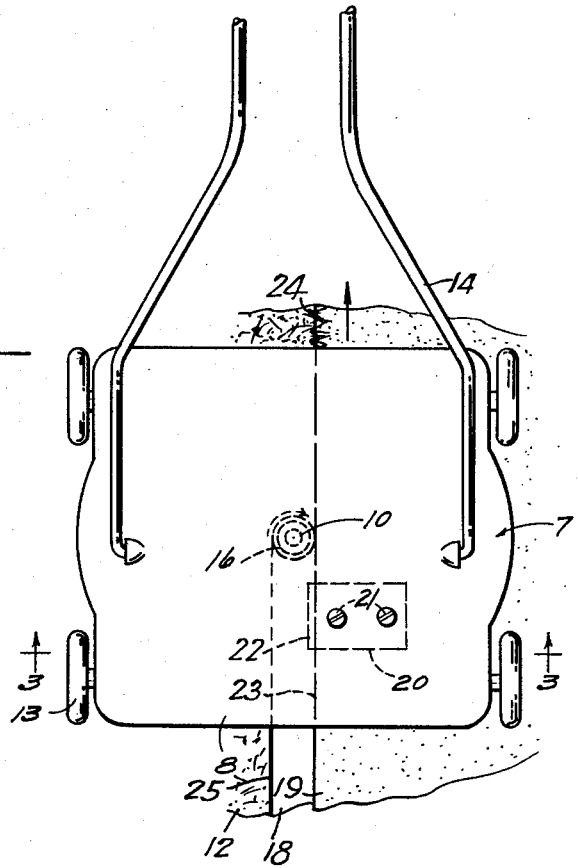
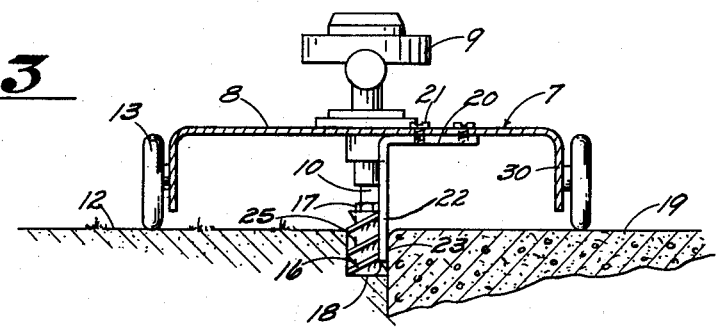
INVENTOR
MAURICE P. HARTNETT
ATTY.

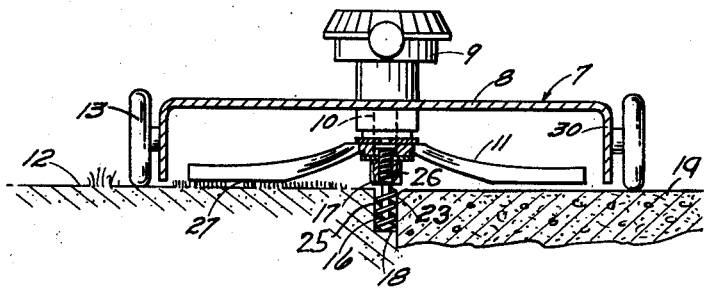
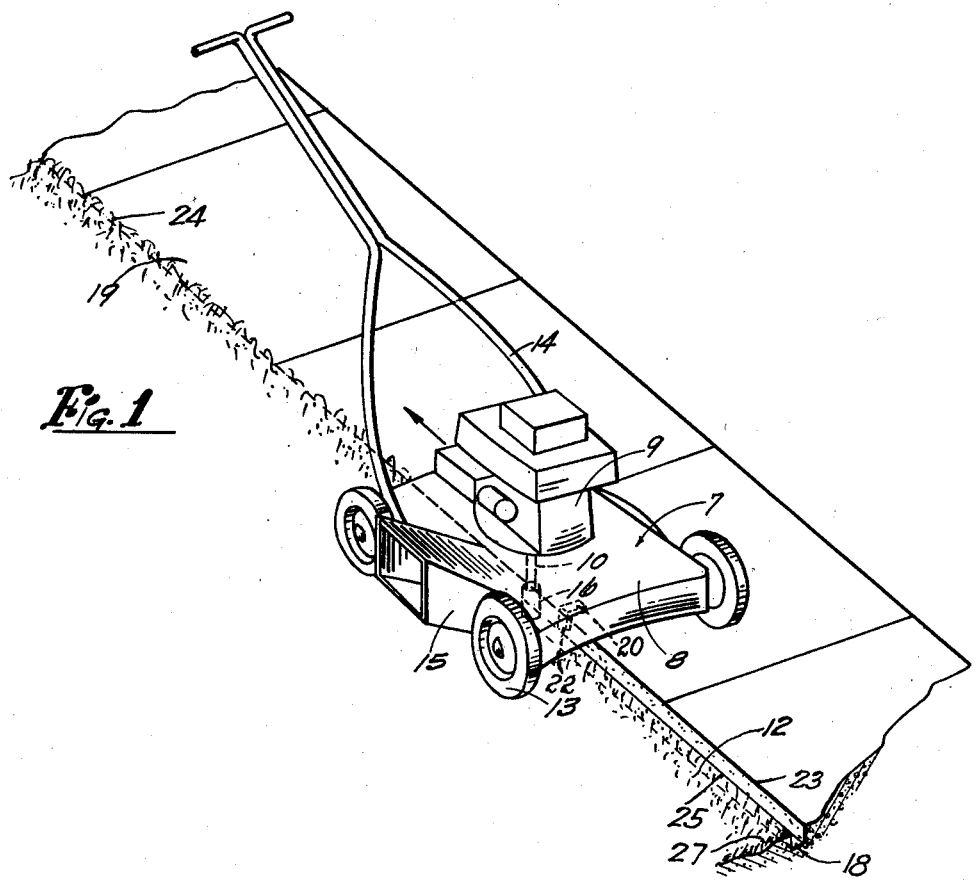

United States Patent Office 3,150,720
Patented Sept. 29, 1964

3,150,720
ATTACHMENT FOR ROTARY POWER MOWERS
Maurice P. Hartnett, Rockford, Ill., assignor to
Andrew F. Wintercorn, Rockford, Ill.
Filed Jan. 30, 1961, Ser. No. 85,795
1 Claim. (Cl. 172—16)

This invention relates to rotary power mowers and is more particularly concerned with attachments for the lower end of the vertical shaft either in lieu of the horizontal cutter blade or in combination therewith, and, while the invention is herein disclosed as embodied in an auger attachment serving as a lawn edger adapted to trim a lawn and simultaneously cut a uniform narrow trench alongside the walk, it is also applicable to mulching, trenching, scarfing or scarifying when different diameters and lengths of rotary augers or other tools are employed. Thus, for example, augers up to say six or eight inches in diameter are contemplated.

The invention is illustrated in the accompanying drawings, in which—

FIG. 1 is a prespective view of a rotary power mower equipped with a lawn edger attachment, illustrating the combination operation performed, namely, edging and simultaneously cutting a trench along the walk;

FIGS. 2 and 3 are, respectively, a plan of view of FIG. 1 and cross-section on the line 3—3 of FIG. 2, and FIG. 4 is a view similar to FIG. 3, showing a lawn edger auger in combination with the conventional rotary cutter blade.

The same reference numerals are applied to corresponding parts throughout the views.

Referring to the drawings, and particularly FIGS. 1 to 3, the reference numeral 7 designates a rotary power mower comprising a generally rectangular housing 8 carrying an engine 9 on top thereof, the driven shaft 10 of which is vertically disposed and normally drives a cutter bar, like that shown at 11 in FIG. 4, operating under the housing 8 in a horizontal plane at a predetermined elevation with respect to the ground 12 on which the rollers 13 supporting the housing rest. The usual handle 14 is pivotally connected to and extends upwardly from the rear of the housing 8, and the mowed grass is discharged to the right of the machine through the usual discharge neck 15.

In accordance with my invention, an auger 16 having a nut 17 in concentric relationship to the upper end thereof and integral therewith is threadedly mounted by means of this nut portion on the threaded lower end of the shaft 10, the auger being of a length so that the major portion of its length is disposed below the level of the surface of the ground 12, as clearly appears in FIG. 3, the length selected depending upon the depth to which it is desired to cut a fairly shallow trench 18 alongside a cement sidewalk 19, as illustrated in FIGS. 1 and 3. An L-shaped bracket 20 is preferably, although not necessarily, provided in combination with the auger 16 detachably secured to the housing 8 on the underside as by means of screws 21 so as to provide a downwardly projecting blade or shoe 22 to slide along the edge 23 of the sidewalk 19 behind and spaced longitudinally of the auger 16 with its guiding surface in a vertical plane tangent to the periphery of the auger 16, as best appears in FIG. 2, to clean off any remaining dirt or roots and guide the mower along a straight line with the auger 16 cutting away the fringe portion 24 of the grass on a straight line, as indicated at 25 in FIG. 1, and at the same time cutting away a narrow strip of sod and ground therebeneath to uniform width and depth so as to define the trench 18 along the walk. The guide blade or shoe 22 is close enough to the auger 16 so that it is an easy matter to guide the auger around fairly sharp curves. The handle 14 is shown swung forward for pulling the mower in the edging operation, which is generally preferred, although the mower can be pushed. In either case, due to the clockwise rotation of the auger, indicated by the dotted arrow in FIG. 2, the mower tends to drift toward the walk 19, thereby maintaining the guide blade 22 in close contact with the edge 23, so that it always performs its cleaning and guiding function properly.

If the cutter blade 11 is left in place on the shaft 10, as shown in FIG. 4, the nut 17 of auger 16 merely replaces the nut that otherwise retains the blade and is threaded onto the threaded end 26 of the shaft 10, and hence the trench 18 is cut simultaneously with the cutting of the grass 27 to approximately one-half the usual width of swath alongside the sidewalk. However, since there is very little advantage gained in cutting this narrow swath at the same time, and there is a risk of having stones dug up by the auger being thrown by the cutter blade 11, and also danger of these stones nicking the blade, it is generally recommended that the blade 11 be removed when the auger 16 is applied.

In operation, these auger attachments make the conventional rotary power mower serve a number of important duties, without in any way running a risk of impairing its utility as a mower, the loads imposed upon the engine in the performance of the auxiliary functions described herein being well within the capacity of the engine 9 to perform. While in most lawn edging jobs it is preferred to operate with the auger 16 and guide blade or shoe 22, as shown in FIGS. 1, 2 and 3, the guide blade or shoe 22 can be removed and an auger can be used below the conventional mower blade 11, as shown in FIG. 4, and, of course, when both the auger 16 and guide blade or shoe 22 are removed from the mower, after a lawn edging job is completed, the mower blade 11 can be replaced on the lower end of the shaft 10 to resume normal use of the mower. Most lawn edgers available are not power operated, and require too much exertion, whereas, with this attachment, this heavy work can be accomplished with ease, using the power available in the engine of the rotary power mower, which a large percentage of householders already have acquired, so that it means only a slight additional cash outlay to make this power operable lawn edger available. On the other hand, the power mulchers available for home use are quite expensive, and generally not very satisfactory, and an auger attachment as herein disclosed for a rotary power mower makes power mulching and scarifying and levelling also available to the house owner for a very moderate cash outlay, and the resulting machine is at least as good as, if not superior to, most machines at present available for home use.

It is believed the foregoing description conveys a good understanding of the objects and advantages of my invention. The appended claim has been drawn to cover all legitimate modifications and adaptations.

I claim:

A machine of the character described comprising a substantially horizontal housing supported on laterally spaced wheels for mobility and support of the housing in a substantially horizontal plane, a substantially vertical drive shaft mounted for rotation relative to said housing, a prime mover mounted on top of said housing and drivingly connected with said shaft, a substantially vertical auger adapted for cutting a narrow shallow trench of the kind suitable for lawn edging alongside a walk, said auger being drivingly mounted detachably on the lower end of said shaft in coaxial relationship therewith and extending a predetermined dimension below the horizontal plane of the housing and the supporting wheels, and vertical guide means rigidly but detachably secured to the under side of and extending downwardly from the housing, said guide means being spaced longitudinally of said auger and in trailing vertically parallel relationship thereto with the guiding surface of the guide means lying in a vertical plane tangent to the periphery of the auger.

References Cited in the file of this patent

UNITED STATES PATENTS

| | | |
|---|---|---|
| 395,364 | Stump | Jan. 1, 1889 |
| 1,026,985 | Irwin | May 21, 1912 |
| 2,139,353 | Bruder | Dec. 6, 1938 |
| 2,393,190 | Ritenour | Jan. 15, 1946 |
| 2,394,771 | Hill | Feb. 12, 1946 |
| 2,622,498 | Wharton | Dec. 23, 1952 |
| 2,680,945 | Reed | June 15, 1954 |
| 2,699,605 | Setter | Jan. 18, 1955 |
| 2,706,441 | Caldwell et al. | Apr. 19, 1955 |
| 2,871,957 | Zacharias | Feb. 3, 1959 |
| 2,992,689 | Laughlin | July 18, 1961 |

FOREIGN PATENTS

| | | |
|---|---|---|
| 251,329 | Great Britain | Apr. 27, 1926 |